(12) United States Patent
Ohmaru

(10) Patent No.: US 8,947,062 B2
(45) Date of Patent: Feb. 3, 2015

(54) POWER SUPPLY CIRCUIT

(75) Inventor: Takuro Ohmaru, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 798 days.

(21) Appl. No.: 13/206,819

(22) Filed: Aug. 10, 2011

(65) Prior Publication Data

US 2012/0043953 A1    Feb. 23, 2012

(30) Foreign Application Priority Data

Aug. 20, 2010   (JP) ................................. 2010-184982

(51) Int. Cl.
*H02M 3/156*    (2006.01)

(52) U.S. Cl.
USPC ......................................... 323/283; 323/285

(58) Field of Classification Search
USPC ................................................ 323/282–285
See application file for complete search history.

(56) References Cited

U.S. PATENT DOCUMENTS

| | | | |
|---|---|---|---|
| 4,769,753 A | 9/1988 | Knudson et al. | |
| 4,914,375 A | 4/1990 | Hatanaka | |
| 5,727,193 A | 3/1998 | Takeuchi | |
| 5,757,214 A * | 5/1998 | Stoddard et al. | 327/110 |
| 6,724,156 B2 | 4/2004 | Fregoso | |
| 6,911,808 B1 * | 6/2005 | Shimamori | 323/283 |
| 6,940,482 B2 | 9/2005 | Ishii et al. | |
| 7,180,515 B2 | 2/2007 | Miyagawa et al. | |
| 7,315,159 B2 * | 1/2008 | Nagai | 323/283 |
| 7,362,078 B2 | 4/2008 | Agari | |
| 7,369,143 B2 | 5/2008 | Koyama | |
| 7,550,955 B2 | 6/2009 | Agari | |
| 8,575,911 B2 * | 11/2013 | Cheng et al. | 323/283 |
| 2002/0060560 A1 | 5/2002 | Umemoto | |
| 2002/0185994 A1 | 12/2002 | Kanouda et al. | |
| 2003/0043090 A1 | 3/2003 | Yazawa et al. | |
| 2003/0160744 A1 | 8/2003 | Yoshida et al. | |
| 2003/0197494 A1 | 10/2003 | Kanouda et al. | |
| 2004/0080501 A1 | 4/2004 | Koyama | |
| 2005/0012698 A1 | 1/2005 | Takahashi | |
| 2005/0110719 A1 | 5/2005 | Satoh et al. | |
| 2005/0116655 A1 | 6/2005 | Yazawa | |
| 2007/0029977 A1 | 2/2007 | Asada | |
| 2009/0009505 A1 | 1/2009 | Koyama | |
| 2011/0068852 A1 | 3/2011 | Yamazaki et al. | |
| 2011/0095825 A1 | 4/2011 | Ito | |
| 2011/0254523 A1 | 10/2011 | Ito et al. | |

FOREIGN PATENT DOCUMENTS

JP    2006-163814 A    6/2006

* cited by examiner

*Primary Examiner* — Jessica Han
(74) *Attorney, Agent, or Firm* — Eric J. Robinson; Robinson Intellectual Property Law Office, P.C.

(57) ABSTRACT

In the case where the duty cycle of the PWM signal exists and the duty cycle of the PWM signal is constant for a certain period, a feedback control circuit is operated intermittently with the duty cycle fixed. Specifically, a power supply circuit includes an A/D converter circuit for forming a digital value based on an analog value obtained by monitoring an output voltage based on a reference voltage, a digital filter circuit for smoothing the digital value, a PWM signal generator circuit for generating a PWM signal based on an output value of the digital filter circuit, and an operation mode control circuit for controlling a circuit operation mode based on the duty cycle of the PWM signal.

8 Claims, 4 Drawing Sheets

POWER SUPPLY CIRCUIT

BACKGROUND OF THE INVENTION

1. Field of the Invention

The present invention relates to a power supply circuit and a semiconductor device having the same.

In this specification, a semiconductor device generally means a device which can function by utilizing semiconductor characteristics, and an electro-optic device, a semiconductor circuit, and an electronic appliance are all semiconductor devices.

2. Description of the Related Art

A power supply circuit such as a switching regulator has been conventionally used for a wide range of electronic appliances typified by an image pickup device and a display device. A portable information terminal such as a mobile phone or a game machine incorporates a power supply circuit. A reduction in size for a reduction in weight of such a portable information terminal has been desired, and moreover a reduction in power consumption thereof has also been desired in order to achieve a long-time operation in which a battery is used as a power supply.

A digital control circuit used for a power supply circuit can have fewer components than an analog control circuit, whereby the size reduction is possible.

However, there is a problem in that the power consumption of the digital control circuit is larger than that of the analog control circuit.

Patent Document 1 has described a reduction in power consumption due to an intermittent operation of a power supply circuit portion when the load is small, for example when a device is in a sleep mode.

REFERENCE

[Patent Document 1] Japanese Published Patent Application No. 2006-163814

SUMMARY OF THE INVENTION

When a power supply circuit is controlled, the output electric power is adjusted using a PWM (pulse width modulation) signal. The case where the duty cycle of a PWM signal does not exist corresponds to the time when the load is small, for example when a device is in a sleep mode.

It is an object of the present invention to achieve a reduction in power consumption of a digital control circuit used for a power supply circuit except when the load is small, that is, in the case where the duty cycle of a PWM signal exists.

In the case where the duty cycle of a PWM signal exists and the duty cycle of a PWM signal has become constant for a certain period, a feedback control circuit (such as a control circuit for a voltage converter circuit) is intermittently operated with the duty cycle fixed. When the duty cycle of a PWM signal is fixed, the reduction in power consumption of the digital control circuit can be realized.

An aspect of the present invention is a power supply circuit including an A/D converter circuit for forming a digital value based on an analog value obtained by monitoring an output voltage based on a reference voltage, a digital filter circuit for smoothing the digital value, a PWM signal generator circuit for generating a PWM signal based on an output value of the digital filter circuit, and an operation mode control circuit for controlling a circuit operation mode based on the duty cycle of the PWM signal.

In the above aspect, the operation mode control circuit includes a clock gating circuit, and the supply of a clock signal to other circuits than the PWM signal generator circuit and the operation mode control circuit is stopped in an operation mode where the duty cycle of the PWM signal is fixed to be constant.

Another aspect of the present invention is a power supply circuit including an A/D converter circuit for forming a digital value based on an analog value obtained by monitoring an output voltage based on a reference voltage, a digital filter circuit for smoothing the digital value, a PWM signal generator circuit for generating a PWM signal based on an output value of the digital filter circuit, a circuit for outputting, in the case where the duty cycle of the PWM signal is fixed to be constant, a flag signal by detecting that the duty cycle has been fixed to be constant, and an operation mode control circuit for controlling based on the flag signal, a first operation mode in which the duty cycle of the PWM signal is fixed and a second operation mode in which the duty cycle is variable.

In the above aspect, the operation mode control circuit includes a clock gating circuit, and the supply of a clock signal to other circuits than the PWM signal generator circuit and the operation mode control circuit is stopped in the first operation mode where the duty cycle of the PWM signal is fixed to be constant.

The power consumption can be reduced by stopping the supply of clock signals to digital control blocks (such as the A/D converter circuit and the digital filter circuit) while the duty cycle of the PWM signal is fixed to be constant.

DETAILED DESCRIPTION OF THE INVENTION

Hereinafter, an embodiment of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to the description of the embodiment below.

Embodiment 1

Figure 1:
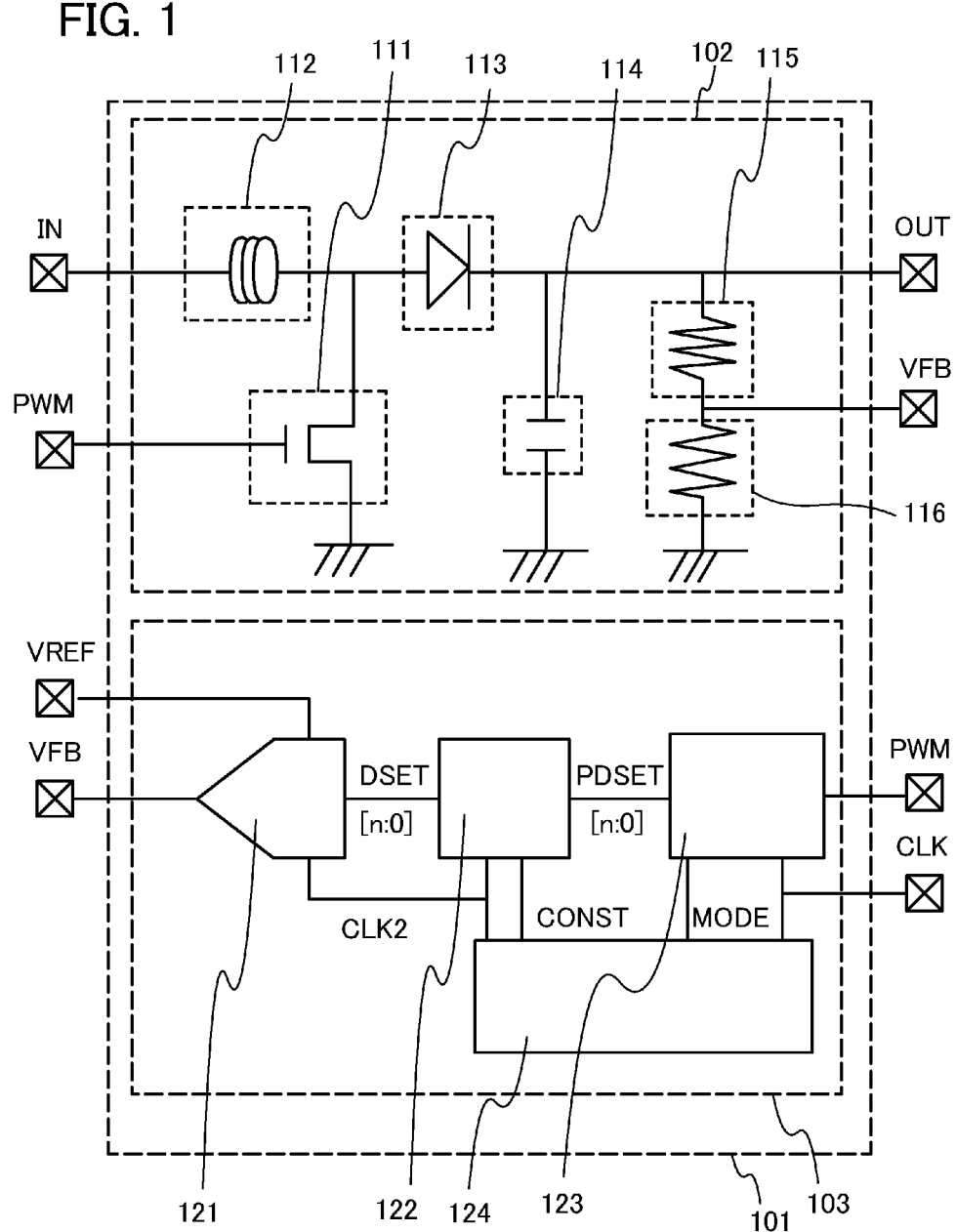
FIG. 1 is a structure diagram of a power supply circuit as an embodiment of the present invention.

FIG. 1 shows an example of a structure of a power supply circuit 101.

The power supply circuit 101 includes a voltage converter circuit 102 and a control circuit 103 for controlling the voltage converter circuit 102. The voltage converter circuit 102 is a DC-DC converter including a transistor 111, a coil 112, a diode 113, a capacitor 114, a resistor 115, and a resistor 116.

The control circuit 103 includes an A/D converter circuit 121, a digital filter circuit 122, a PWM signal generator circuit 123, and an operation mode control circuit 124.

A feedback voltage VFB as an output voltage of the resistor 115 is input to the A/D converter circuit 121. The output PWM of the PWM signal generator circuit 123 is input to a gate of the transistor 111.

A DC-DC converter is a circuit which converts a direct-current voltage to another direct-current voltage. Typical conversion modes of a DC-DC converter include a linear mode and a switching mode. A switching mode DC-DC converter has excellent conversion efficiency. In Embodiment 1, a switching mode DC-DC converter, particularly a chopper-type DC-DC converter including a transistor, a coil, a diode, and a capacitor is used as the voltage converter circuit 102.

The A/D converter circuit 121 converts a feedback voltage from the voltage converter circuit 102 to a digital value DSET based on a reference voltage VREF.

The digital filter circuit 122 smoothes the digital value DSET output from the A/D converter circuit 121 to output a digital value PDSET.

The PWM signal generator circuit 123 detects a difference between the digital value of the reference voltage VREF and the digital value PDSET output from the digital filter circuit 122, and controls the duty cycle of the PWM signal based on the difference.

In the case where the reference voltage VREF is larger than the digital value PDSET output from the digital filter circuit 122, the duty cycle of the PWM signal is increased in the PWM signal generator circuit 123.

In the case where the reference voltage VREF is smaller than the digital value PDSET output from the digital filter circuit 122, the duty cycle of the PWM signal is decreased in the PWM signal generator circuit 123.

The PWM signal generator circuit 123 controls so as to vary or fix the duty cycle of the PWM signal depending on an operation mode control signal MODE from the operation mode control circuit 124.

The operation mode control circuit 124 outputs a MODE signal for controlling the duty cycle of the PWM signal to be a fixed mode or a variable mode.

In the case where the MODE signal is the fixed mode, the supply of a clock signal CLK2 to other control blocks than the PWM signal generator circuit 123 for generating the PWM signal is stopped.

Figure 4:
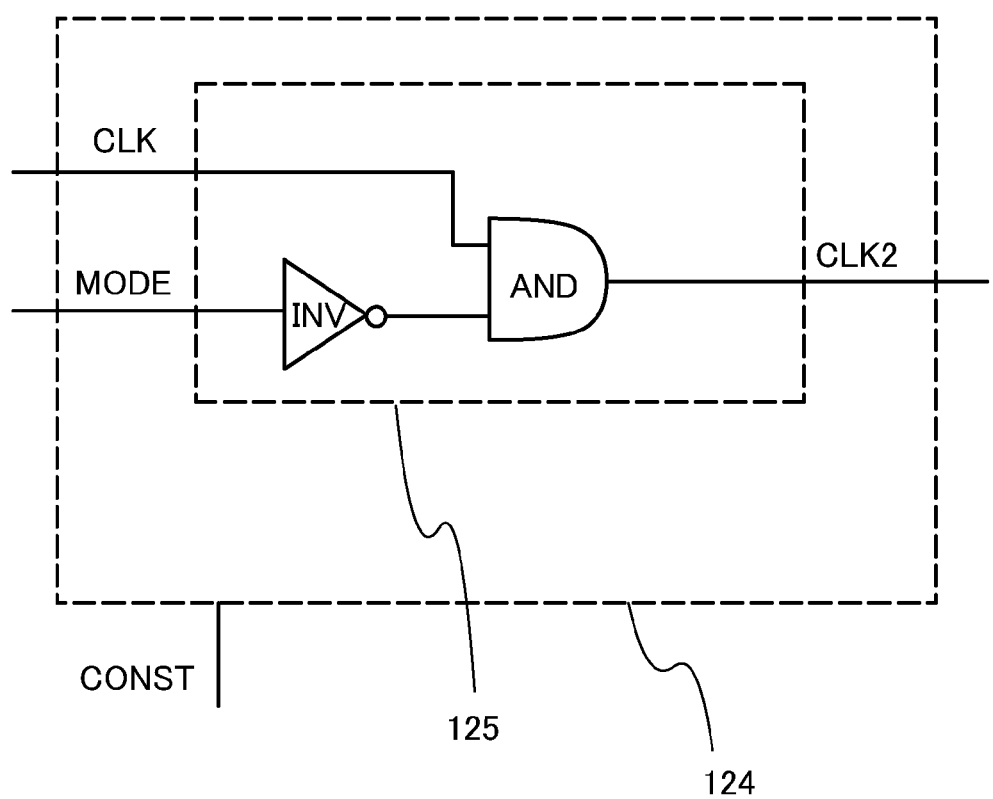
FIG. 4 is a structure diagram of a clock gating circuit as an embodiment of the present invention.

The operation mode control circuit 124 includes at least a clock gating circuit 125, and the supply of a clock signal to other circuits than the PWM signal generator circuit and the operation mode control circuit is stopped in the operation mode where the duty cycle of the PWM signal is fixed to be constant. FIG. 4 shows an example of the clock gating circuit 125. The clock gating circuit 125 includes an inverter circuit and an AND circuit. A MODE signal and a clock signal CLK are input to the clock gating circuit 125 and a clock signal CLK2 is output from the clock gating circuit 125 to the A/D converter circuit 121 or the digital filter circuit 122.

Figure 2:
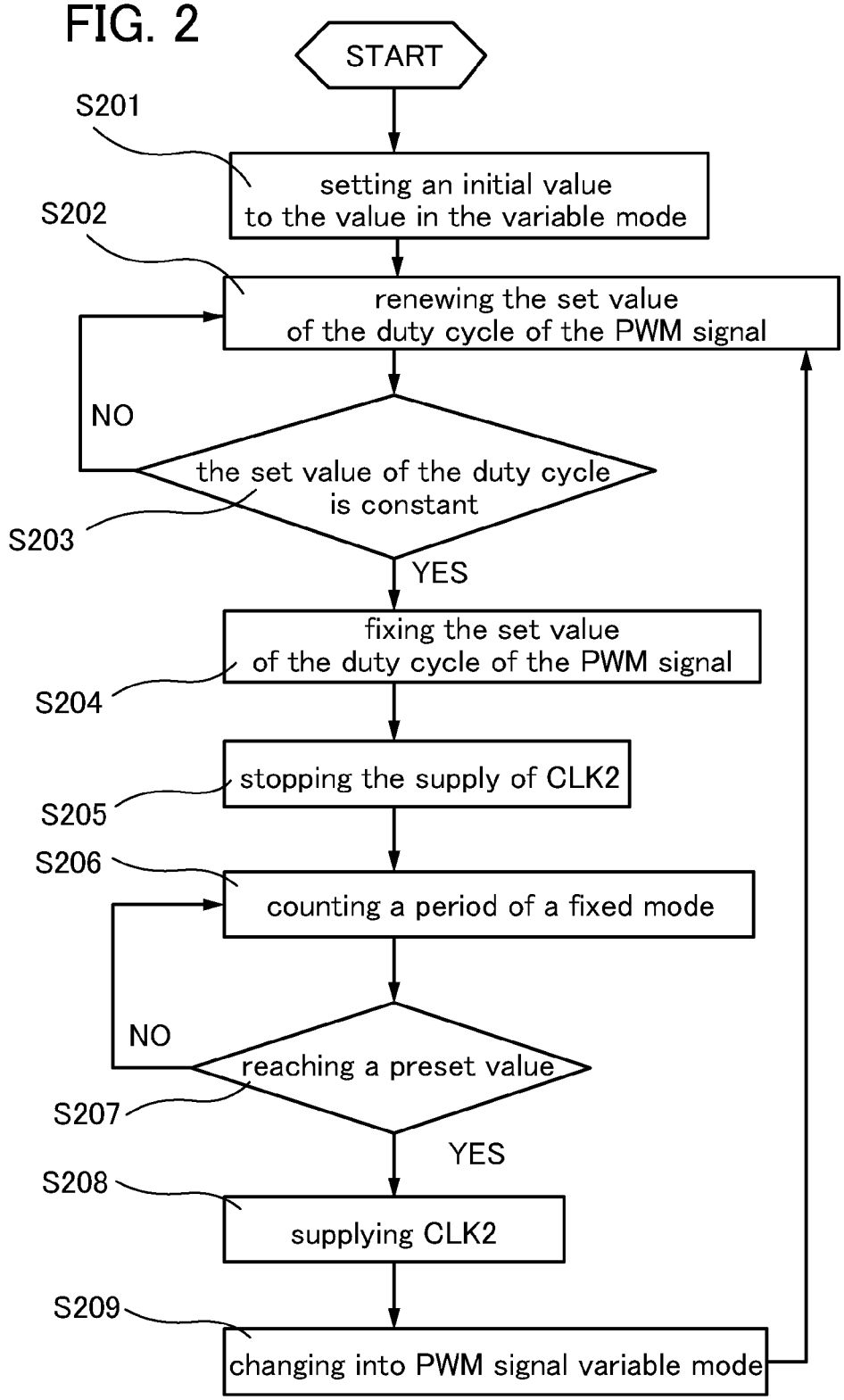
FIG. 2 is a flow chart of mode control in an embodiment of the present invention.

FIG. 2 shows an example of a flow chart of the operation mode control circuit 124.

First, an initial value is assigned to a set value of the duty cycle of the PWM signal in the variable mode (S201). Then, the set value is renewed in accordance with the output value of the digital filter circuit 122 (S202).

Then, when the output of the digital filter circuit 122 has become constant (S203), the operation mode changes into the operation mode where the duty cycle of the PWM signal is fixed (S204).

Next, the supply of the clock signal CLK2 to the control blocks other than the PWM signal generator circuit and the operation mode control circuit is stopped (S205).

Next, the time after the stop of the clock signal CLK2 is counted using a counter inside the operation mode control circuit (S206). Then, the value in the counter reaches a certain preset number (S207). When the number in the counter reaches the preset value, the clock signal which has been stopped is supplied again (S208).

Next, the operation mode changes into the operation mode where the duty cycle of the PWM signal is variable (S209).

This successive flow continues for a period of time for which the output of the digital filter circuit 122 is constant.

Figure 3:
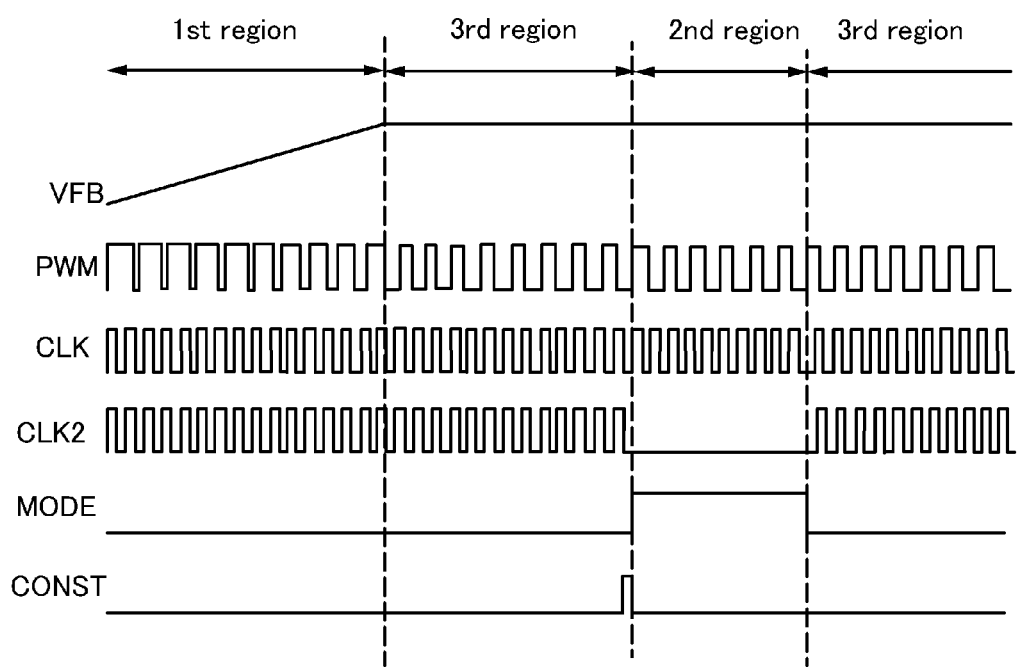
FIG. 3 is a timing chart.

FIG. 3 is a timing chart of signals.

In a first region where the feedback voltage VFB is away from the reference voltage VREF, the duty cycle of the PWM signal is variable.

In the first region, the output of the MODE signal for controlling the operation mode is "LOW" and the mode becomes the variable mode.

In a second region where the feedback voltage VFB is close to or equal to the reference voltage VREF, the duty cycle of the PWM signal is constant.

In the second region, that the PWM signal has become constant is detected to flag a CONST signal.

In the second region, when the CONST signal is flagged, the output of the MODE signal is "HIGH" and the mode becomes a fixed mode.

In the case where the duty cycle of the PWM signal is the fixed mode, the supply of the clock signal CLK2 to the control blocks (the A/D converter circuit 121 and the digital filter circuit 122) other than the PWM signal generator circuit and the operation mode control circuit is stopped.

In a third region after a certain period of time after the duty cycle of the PWM signal becomes the fixed mode, the duty cycle of the PWM signal varies.

In the third region, in the case where the duty cycle of the PWM signal varies, the set value of the duty cycle of the PWM signal is made to vary until the duty cycle of the PWM signal becomes constant.

In the third region, in the case where the duty cycle of the PWM signal is constant, the state returns to the state in the second region.

In the second region where the duty cycle of the PWM signal is fixed to be constant, the supply of the clock to the control blocks is stopped, whereby the power consumption can be reduced.

This application is based on Japanese Patent Application Ser. No. 2010-184982 filed with Japan Patent Office on Aug. 20, 2010, the entire contents of which are hereby incorporated by reference.

What is claimed is:

1. A power supply circuit comprising:
an A/D converter circuit for forming a digital value in accordance with an output voltage based on a reference voltage;
a digital filter circuit for smoothing the digital value;
a PWM signal generator circuit for generating a PWM signal based on an output value of the digital filter circuit; and
an operation mode control circuit for controlling a circuit operation mode based on a duty cycle of the PWM signal,
wherein the operation mode control circuit comprises a clock gating circuit, and
wherein the clock gating circuit is configured to stop supply of a clock signal to the A/D converter circuit and the digital filter circuit in an operation mode where the duty cycle of the PWM signal is fixed to be constant.

2. The power supply circuit according to claim 1, wherein the clock gating circuit comprises an AND circuit and an inverter circuit electrically connected to one input terminal of the AND circuit.

3. A power supply circuit comprising:
   an A/D converter circuit for forming a digital value in accordance with an output voltage based on a reference voltage;
   a digital filter circuit for smoothing the digital value;
   a PWM signal generator circuit for generating a PWM signal based on an output value of the digital filter circuit;
   an operation mode control circuit for controlling a circuit operation mode based on a duty cycle of the PWM signal; and
   a circuit for outputting, in a case where the duty cycle of the PWM signal is fixed to be constant, a flag signal by detecting that the duty cycle of the PWM signal is fixed to be constant,
   wherein the operation mode control circuit is configured to control based on the flag signal, a first operation mode in which the duty cycle of the PWM signal is fixed and a second operation mode in which the duty cycle is variable,
   wherein the operation mode control circuit comprises a clock gating circuit, and
   wherein the clock gating circuit is configured to stop supply of a clock signal to the A/D converter circuit and the digital filter circuit in the first operation mode where the duty cycle of the PWM signal is fixed to be constant.

4. The power supply circuit according to claim 3, wherein the clock gating circuit comprises an AND circuit and an inverter circuit electrically connected to one input terminal of the AND circuit.

5. A power supply circuit comprising:
   an A/D converter circuit for forming a digital value in accordance with an output voltage based on a reference voltage;
   a digital filter circuit for smoothing the digital value;
   a PWM signal generator circuit for generating a PWM signal based on an output value of the digital filter circuit; and
   an operation mode control circuit for controlling a circuit operation mode based on a duty cycle of the PWM signal
   a voltage converter circuit comprising:
      an input terminal;
      a coil electrically connected to the input terminal;
      a diode, wherein one terminal of the diode is electrically connected to the coil;
      a transistor, wherein one terminal of the transistor is electrically connected to the coil and the one terminal of the diode; and
      an output terminal electrically connected to the other terminal of the diode;
   wherein the PWM signal generator circuit is electrically connected to a gate of the transistor,
   wherein the A/D converter circuit is electrically connected to the output terminal with a resistor interposed therebetween,
   wherein the operation mode control circuit comprises a clock gating circuit, and
   wherein the clock gating circuit is configured to stop supply of a clock signal to the A/D converter circuit and the digital filter circuit during the duty cycle of the PWM signal being fixed to be constant.

6. The power supply circuit according to claim 5, wherein the clock gating circuit comprises:
   an inverter; and
   an AND circuit having:
      a first input terminal electrically connected to the gate of the transistor;
      a second input terminal electrically connected to the inverter; and
      an output terminal electrically connected to the A/D converter circuit and the digital filter circuit.

7. A method for driving a power supply circuit, comprising the steps of:
   detecting that an output of a digital filter circuit is fixed to be constant;
   outputting a flag signal from the digital filter circuit to an operation mode control circuit by detecting that the output of the digital filter circuit is fixed to be constant;
   stopping supply of a clock signal to the digital filter circuit and an A/D converter circuit in accordance with the flag signal, wherein the A/D converter circuit is configured to output a digital signal to the digital filter circuit in accordance with an input of an analog signal to the A/D converter circuit.

8. The method for driving a power supply circuit according to claim 7,
   wherein a duty cycle of a PWM signal output from a PWM generator circuit is constant during the supply of the clock signal being stopped, and
   wherein the PWM generator circuit is electrically connected to the digital filter circuit and the operation mode control circuit.

* * * * *